United States Patent [19]

Hakaridani et al.

[11] 4,303,916
[45] Dec. 1, 1981

[54] MULTI-ITEM INPUT/OUTPUT DEVICE TO INPUT INFORMATION TO AND RETRIEVE OTHER INFORMATION FROM A TERMINAL COMPUTER

[75] Inventors: Mitsuhiro Hakaridani; Hiroshi Kamada; Hitoshi Suzuki, all of Nara; Mikio Osaki, Kashihara, all of Japan

[73] Assignee: Sharp Kabushiki Kaisha, Osaka, Japan

[21] Appl. No.: 71,669

[22] Filed: Aug. 31, 1979

[30] Foreign Application Priority Data

Aug. 31, 1978 [JP] Japan ................................ 53-107991

[51] Int. Cl.³ ............................................. G06F 3/14
[52] U.S. Cl. ..................................... 340/712; 340/707; 340/286 M
[58] Field of Search ............... 340/707, 708, 712, 525, 340/286 M

[56] References Cited

U.S. PATENT DOCUMENTS

| | | | |
|---|---|---|---|
| 3,760,373 | 9/1973 | Bartz | 340/707 |
| 3,898,636 | 8/1975 | Smith | 340/707 |
| 3,932,862 | 1/1976 | Graven | 340/707 |
| 4,065,754 | 12/1977 | Miura et al. | 340/708 |
| 4,104,617 | 8/1978 | Bean et al. | 340/707 |
| 4,190,833 | 2/1980 | Bejting et al. | 340/707 |

*Primary Examiner*—Marshall M. Curtis
*Attorney, Agent, or Firm*—Birch, Stewart, Kolasch and Birch

[57] ABSTRACT

A multi-item input/output display device is disclosed which includes a sheet bearing a plurality of markings indicative of respective items, a display matrix array provided for respective ones of the item markings on the sheet, a scanner for sequentially scanning those display elements in the array and a light pen carrying a light sensor and adapted to develop a code signal indicative of a specific selected item when the specific item is illustrated with the light pen, the code signal applied from outside being displayed by those display elements.

6 Claims, 4 Drawing Figures

MULTI-ITEM INPUT/OUTPUT DEVICE TO INPUT INFORMATION TO AND RETRIEVE OTHER INFORMATION FROM A TERMINAL COMPUTER

BACKGROUND OF THE INVENTION

This invention relates to an input/output device for various operations of computers such as information retrieval, and more particularly an input/output device which sends inputs external thereto, for example, the interior of computers and also provides a display of processed results.

In the past, several attempts have been made in input-/output devices for computer use, for example, an input/output device having a multi-item keyboard input section and an output section. However, the prior art devices were not self adaptable to a considerable increase in the number of input items due to a corresponding increase of the number of display elements, key switches and components associated with the display elements nor suitable from a standpont of practical use when the items amount to more than 1000. While exhange of input formats can be considered an effective way to cope with an increase in the key switches and the display elements, the functions of an input device were satisfactory to some extent but the functions of an output display were considerably damaged and impracticable in various aspects.

SUMMARY OF THE INVENTION

With the foregoing in mind, it is an object of the present invention to provide an input/output device which eliminates the need for increasing the number of key switches with an increasing number of input items by operating output display elements also as input means.

To achieve the above described object, a multi-item input/output display device according to the present invention comprises a sheet bearing a plurality of markings indicative of respective items, display elements provided for a respective one of said item markings on said sheet, a scanner for sequentially scanning those display elements and a light pen carrying a light sensor and adapted to develop a code signal indicative of a specific selected item when said specific item is illustrated with the light pen, said code signal applied from outside being displayed by those display elements.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

A specific embodiment of the present invention will now be described in terms of retrieval of personal information by reference to the accompanying drawings.

Figures 1, 2:
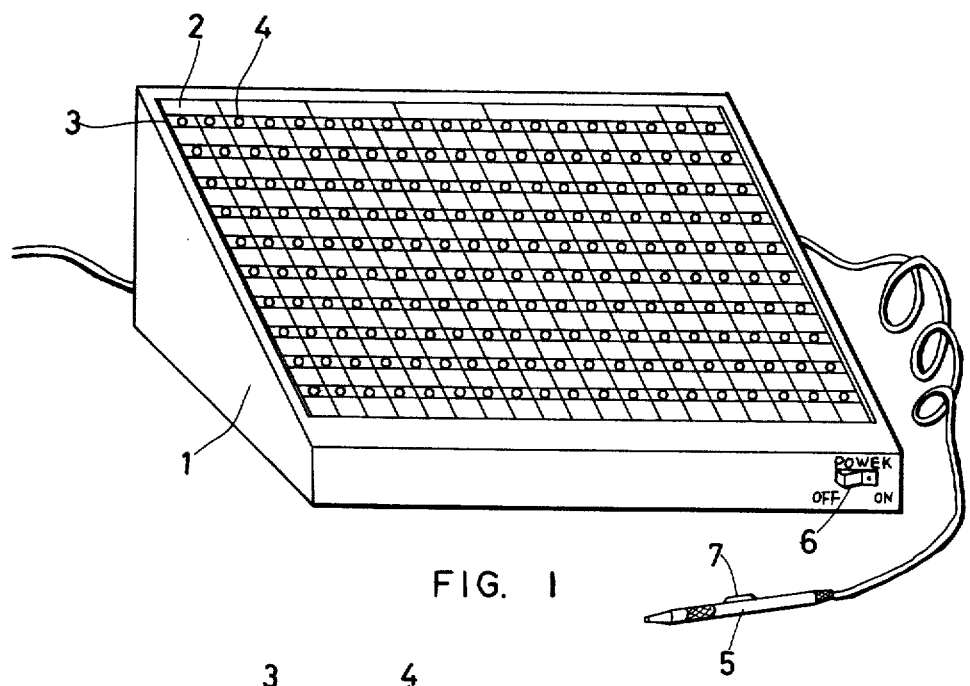
FIG. 1 is a perspective view of a device according to the present invention.
FIG. 2 is a partly enlarged view of a display section.

Referring first to FIG. 1, there is illustrated a housing 1, a sheet 2 bearing a number of input item markings and mounted on the housing 1, an apertured frame 3 defining a respective one of the item markings, and a display array 4 such as a light emitting diode array mounted on the housing 1 for displaying not only outputs but also inputs. A light pen 5 is used to specify the input items. There are further provided a power switch 6 and a light pen input switch 7.

As indicated in FIG. 2, the multi-item sheet 2 contains, for example, 190 item entries 2a of 10 rows by 19 columns and descriptions 2b at the uppermost column.

Figure 3:
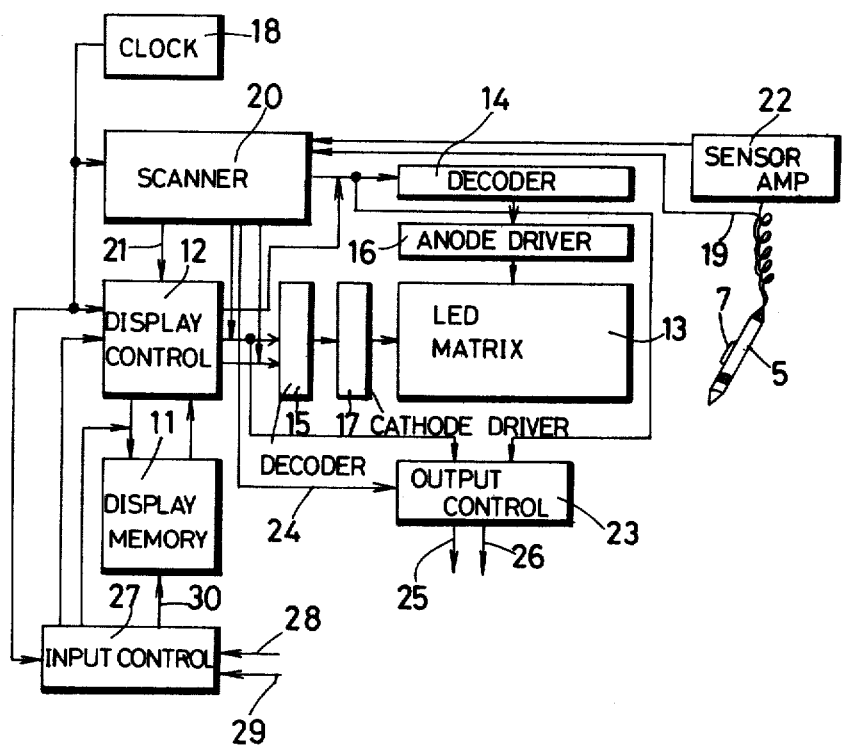
FIG. 3 is a block diagram of the device according to the present invention.

Structure and operation of a device according to the present invention will be described with reference to a block diagram of FIG. 3.

Upon placing the display control 12 into a display mode the operating states of respective flip flops in a counter (not shown) contained within the display control 12 are transferred into the decoders 14 and 15, the decoder 15 being loaded with the contents of the displaying memory 11 addressed by the counter. As a result, the decoder 14 receives the contents of upper 5 bits of the counter and the decoder 15 receives the contents of the lower 4 bits of the counter and the contents of the displaying memory 11 as enable inputs to the decoder 15. One of the anode drivers 16 is selected by the decoder 14 and one of the cathod drivers 17 is selected or non-selected according to the enable inputs to the decoder 15, thus enabling or disabling the respective display elements in the display matrix array 13. The count of the counter within the display control 12 is sequentially incremented by the output of a clock generator 18.

To introduce a desired item, the light pen 5 is positioned to select one of the display elements within the display matrix array 13 such that the light sensor (the tip) within the light pen 5 is brought into close contact with that display element. When the switch 7 is flipped on, a switch-on signal is conveyed into a scan control 20 along a signal line 19. Upon the receipt of the switch on signal at the scan control 20 a counter (not shown) within the scan control 20 is reset and the display control 12 is supplied with a display inhibition signal via a signal line 21 and thus placed into a display inhibition mode. Upon the receipt of the display inhibition signal, the output of the counter within the display control 12 connected to the decoders 14 and 15 exhibits a high impedance.

Similar to the display control 12, the scan control 20 also includes a 9-bit counter of which the upper 5 bit contents are sent to the decoder 14 and the lower 4 bit contents are sent to the decoder 15. The decoder 15 also receives an enable signal. The count of the counter is incremented in sequence in response to the output of the clock generator 18.

The output of the light sensor within the light pen 5 which is to be applied via a sensor amplifier 22 to the scan control 20, is developed when the display element (as specified by the light pen for selection of a desired item) right below the light sensor is enabled to emit light. In response to the output developed a strobe signal is supplied from the scan control 20 to an output control 23 via a signal line 24. Upon the development of the strobe signal the output control 23 receives and stores 9-bit input signals to the decoders 14 and 15 in the form of code signals indicative of the coordinates of the input item specified and delivers the strobe signal and the 9-bit data signals to an external source via signal lines 25 and 26.

The scan control 20 discontinues incrementing the self-contained counter when the counter is energized by the output from the light sensor, and sends a control signal to the display control 12 so that the display control 12 is returned to the display mode and the output of the counter within the scan control 12 is held in the tri-state.

The input control 27 which receives inputs from an external device for example, computers, is supplied with displaying data of say 10 bits and the strobe signal via signal lines 28 and 29. The 10-bit long data comprise column specifying 5 bits, row specifying 4 bits and an enable or disable control 1 bit.

The input control 27 supplies the display control 12 with a control signal as soon as it receives the strobe signal via the signal line 29, thus placing the display control 12 into the display inhibition state. The address of the displaying memory 11 is switched to the input control side 27 so that the 9-bit input data give access via a signal line 30 to the memory 11 wherein the 1-bit contents are written. After the completion of the write operation the display control 12 stands in the display mode whereby the contents of the memory 11 are displayed on the display matrix display 13. If the contents of the displaying memory 11 are modified according to the data received, the associated display elements in the display matrix array 13 changes from the enable state to the disable or from the disable state to the enable state.

Figure 4:
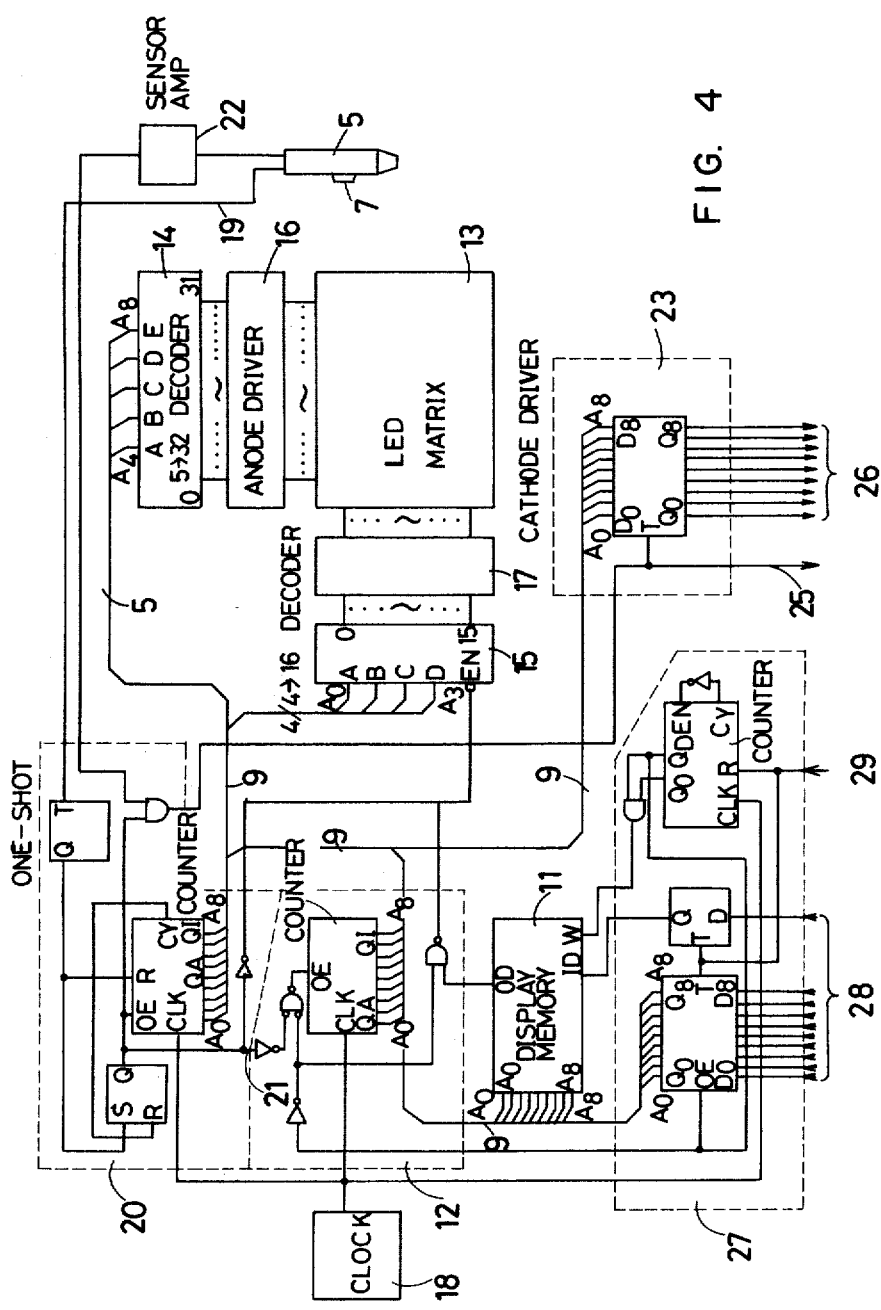
FIG. 4 is a more detailed block diagram of the device shown in FIG. 3.

The following sets forth an example of the use of the device according to the present invention as an input/output device for retrieval of personal information. "Driver's license" and "university graduate" are sequentially specified by the light pen 5 so that the host computer responds to their associated code signals to produce the corresponding coordinate code display enable signals. Thereafter, if the function "START" is selected by the light pen 5, the host computer functions to retrieve complete data relating to all the corresponding persons from its file memory. At the same time the input/output device of the present invention provides a display of the particulars on all the intended persons. The display includes not-specified items concerning those persons, for example, "job identifying number" and thus is very easy to read. FIG. 4 shows further detail of the circuit arrangement of FIG. 3 which may be implemented with IC technology.

As noted earlier, the present invention may be used with an external device such as a computer without the need to use another output device such as a printer and a cathod ray tube, thereby preventing increasing cost of the input/output device.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A multi-item input/output device for use in combination with an external memory means, comprising:
   a sheet bearing a multiplicity of items;
   a display element array on said sheet including a plurality of light-emitting display elements, each of said display elements corresponding to a respective one of said multiplicity of items on said sheet;
   a light pen carrying a light sensor and a switch, said light pen developing output signals when said light sensor intercepts the light emitted from a corresponding one of said display elements;
   a scan control for sequentially scanning said display element array in response to an input signal from said switch;
   an output control for converting said output signals from said light pen into code signals corresponding to the respective display element, said code signals energizing said external memory means for recalling information therefrom related to the item associated with the corresponding one of said display elements;
   an input control for receiving said information from said external memory means and developing an output signal in response thereto; and
   a display control means responsive to said output signal from said input control for enabling and disabling said display element array according to said information received from said external memory means, said display element array serving as a sequentially scanned display array when a specific item is selected by said light pen, and serving as a display means of said information recalled from said external memory means.

2. A multi-item input/output device according to claim 1, wherein said display control has a display mode and a display inhibition mode, said display inhibition mode being set when said switch on said light pen indicates that said light pen is operable to specify the items.

3. A multi-item input/output device according to claim 1, wherein said output control of said input/output device is connected to a host computer for retrieval of said information.

4. A multi-item input/output device in accordance with claim 1 further comprising memory means connected between said input control and said display control and responsive to said output signal from said input control for storing said information therein, said display control enabling and disabling said display element array according to said information stored in said memory means.

5. A multi-item input/output device in accordance with claim 4 further comprising a sensor amplifier connected between said light pen and said scan control for amplifying said output signals developed from said light pen.

6. A multi-item input/output device in accordance with claim 5 further comprising clock generator means for driving said scan control.

* * * * *